United States Patent
Onodera et al.

(10) Patent No.: US 8,422,443 B2
(45) Date of Patent: Apr. 16, 2013

(54) BASE STATION APPARATUS, TERMINAL APPARATUS AND COMMUNICATION SYSTEM

(75) Inventors: Takashi Onodera, Osaki (JP); Toshizo Nogami, Osaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 391 days.

(21) Appl. No.: 12/672,259

(22) PCT Filed: Aug. 5, 2008

(86) PCT No.: PCT/JP2008/063997
§ 371 (c)(1),
(2), (4) Date: Feb. 4, 2010

(87) PCT Pub. No.: WO2009/020110
PCT Pub. Date: Feb. 12, 2009

(65) Prior Publication Data
US 2011/0216711 A1    Sep. 8, 2011

(30) Foreign Application Priority Data

Aug. 7, 2007 (JP) .................................. 2007-205862

(51) Int. Cl.
*H04W 4/00* (2009.01)
(52) U.S. Cl.
USPC ......................... 370/329; 370/437; 455/452.2
(58) Field of Classification Search .................. 370/322, 370/329, 341, 348, 437, 443; 455/450, 452.1, 455/452.2, 464, 154.1, 158.1, 161.1, 166.2
See application file for complete search history.

(56) References Cited

U.S. PATENT DOCUMENTS 5,640,395 A * 6/1997 Hamalainen et al. ......... 370/322

2001/0024427 A1    9/2001 Suzuki
(Continued)

FOREIGN PATENT DOCUMENTS

CN          1484906 A    3/2004
EP       1 865 736 A1    12/2007
(Continued)

OTHER PUBLICATIONS

3GPP "Sensitivity of DL/UL Performance to CQI-Compression with text Proposal", TSG-RAN WG1 ad hoc meeting on LTE, R1-060228, Jan. 2006.

(Continued)

*Primary Examiner* — Jeffrey M Rutkowski
(74) *Attorney, Agent, or Firm* — Birch, Stewart, Kolasch & Birch, LLP (57) ABSTRACT

Reception quality measurement results of respective channels which have been outputted from a reception quality measuring section 308 are inputted to a selected channel determining section 341 and a channel quality information generating section 342. The number of selected channels M which has been previously defined or the number of selected channels M which has been outputted from a control information obtaining section 314 is inputted to the selected channel determining section 341 and a channel identification information generating section 343. The channel identification information generating section 343 selects one of a first representation format for representation with M channel numbers indicating the respective selected channels, and a second representation format for representation representing whether or not each of all the channels is included in the selected channels, based on the number of selected channels M, and uses the selected representation format to generate and output channel identification information.

23 Claims, 8 Drawing Sheets

U.S. PATENT DOCUMENTS

| | | |
|---|---|---|
| 2005/0063334 A1* | 3/2005 | Fnu et al. .................. 370/329 |
| 2006/0089102 A1 | 4/2006 | Nishio et al. |
| 2006/0198293 A1 | 9/2006 | Nishio et al. |
| 2007/0121543 A1* | 5/2007 | Kuchibhotla et al. ........ 370/329 |
| 2007/0195897 A1 | 8/2007 | Cheng et al. |
| 2007/0207810 A1* | 9/2007 | Cho et al. .................. 455/450 |
| 2007/0248046 A1* | 10/2007 | Khan ........................ 370/329 |
| 2008/0137597 A1* | 6/2008 | Lu ............................ 370/329 |
| 2008/0205334 A1* | 8/2008 | Yu et al. ..................... 370/329 |
| 2009/0325585 A1* | 12/2009 | Farajidana et al. .......... 455/450 |
| 2010/0069081 A1* | 3/2010 | Mitra et al. ................ 455/452.2 |
| 2010/0165933 A1* | 7/2010 | Fukui et al. ................ 370/329 |
| 2010/0284348 A1* | 11/2010 | Kashima et al. ............ 370/329 |
| 2012/0069755 A1 | 3/2012 | Li et al. |

FOREIGN PATENT DOCUMENTS

| | | |
|---|---|---|
| EP | 1 909 518 A1 | 4/2008 |
| JP | 11-508417 A | 7/1999 |
| JP | 2001-238269 A | 8/2001 |
| JP | 2004-208234 A | 7/2004 |
| JP | 2006-50545 A | 2/2006 |
| WO | WO-97/01256 A1 | 1/1997 |
| WO | WO-2005/015801 A2 | 2/2005 |
| WO | WO-2005/089000 A1 | 9/2005 |
| WO | WO-2006/109435 A1 | 10/2006 |
| WO | WO-2007/023515 A1 | 3/2007 |
| WO | WO-2007/148633 A1 | 12/2007 |
| WO | WO 2008137786 A1 * | 11/2008 |
| WO | WO 2009059428 A1 * | 5/2009 |

OTHER PUBLICATIONS

Chinese Office Action 200880101943.6 issued Jul. 2, 2012.

* cited by examiner

| Channel number | Reception quality measurement result |
|---|---|
| 0 | 6 |
| 1 | 7 |
| 2 | 4 |
| 3 | 1 |
| 4 | 6 |
| 5 | 12 |
| 6 | 15 |
| 7 | 13 |
| 8 | 5 |
| 9 | 10 |
| 10 | 14 |
| 11 | 8 |
| 12 | 3 |
| 13 | 0 |
| 14 | 9 |
| 15 | 14 |

FIG. 7

| Channel identification information (First representation format) | Channel quality information |
|---|---|
| 6 | 15 |
| 10 | 14 |
| 15 | 14 |

BASE STATION APPARATUS, TERMINAL APPARATUS AND COMMUNICATION SYSTEM

TECHNICAL FIELD

The present invention relates to a communication technique, and particularly to a communication system which measures reception quality of each channel from a received signal and reports a result thereof to a base station apparatus, as well as the base station apparatus and a terminal apparatus in the communication system.

BACKGROUND ART

As a method of improving communication efficiency (a substantial transmission speed in consideration of a total throughput of a system and occurrence of reception errors), there has been proposed a scheme for adaptively selecting communication parameters such as a modulation scheme, a channel coding rate, an error correction coding scheme, a spreading rate, a code multiplexing number and transmission power, based on indices indicating a propagation path state and reception quality, such as received signal power and an SINR (Signal to Interference plus Noise power Ratio) (see the following Non-Patent Document 1). Particularly, a scheme for adaptively selecting modulation parameters such as the modulation scheme and the channel coding rate is referred to as "adaptive modulation scheme".

Moreover, in a communication system which is composed of a base station apparatus and a plurality of terminal apparatuses, and uses multicarrier communication in communication from the base station apparatus to the terminal apparatus (downlink), there has been considered a scheme for scheduling for assigning a channel to each terminal apparatus, and further, for the downlink, performing adaptive modulation for each channel consisting of one subcarrier or several subcarriers, depending on downlink signal reception quality of each channel in each terminal apparatus (see the following Non-Patent Document 2 and Non-Patent Document 3).

It should be noted that, in the communication system employing the scheduling or the adaptive modulation scheme based on the reception quality of the terminal apparatus, in order to assign the channel or to determine the modulation parameters, a communication partner needs to be notified of the indices indicating the propagation path state and the reception quality, such as the received signal power and the SINR, of the channel used for the communication.

In the communication system as described above, each terminal apparatus needs to notify the base station apparatus of channel quality information representing the reception quality related to each channel, by using a control channel or the like for communication from the terminal apparatus to the base station apparatus (uplink). Consequently, there has been a problem in that an amount of information in the channel quality information transmitted in the unlink enormously increases in proportion to the number of the terminal apparatuses and the number of the channels.

In order to improve the above described problem, for the purpose of reducing the amount of information in the channel quality information transmitted in the uplink, there has been proposed a method in which a predetermined number of channels with good reception quality are selected in order of goodness of the reception quality, from all the channels assigned to each terminal apparatus by a base station for communication, and the base station apparatus is notified of only the reception quality of those some channels (see the following Patent Document 1, Patent Document 2, Non-Patent Document 3 and Non-Patent Document 4).

Patent Document 1: JP Patent Publication (Kokai) No. 2004-208234
Patent Document 2: JP Patent Publication (Kokai) No. 2006-50545
Non-Patent Document 1: Kishiyama et al., "Experimental Evaluations of Adaptive Modulation and Channel Coding in Forward Link for VSF-OFCDM Broadband Wireless Access", The Technical Report of the Institute of Electronics, Information and Communication Engineers, May 2003, RCS2003-25
Non-Patent Document 2: Maehara et al., "On OFDM/TDD Transmission Scheme with Subcarrier Adaptive Modulation", 2001 General Conference of the Institute of Electronics, Information and Communication Engineers, March 2001, B-5-100, p. 498
Non-Patent Document 3: "CQI report and scheduling procedure", 3GPP, TSG-RAN WG1 Meeting #42bis, R1-051045, October 2005
Non-Patent Document 4: "Sensitivity of DL/UL Performance to CQI-Compression with Text Proposal", 3GPP, TSG-RAN WG1 ad hoc meeting on LTE, R1-060228, January 2006

DISCLOSURE OF THE INVENTION

Problems to be Solved by the Invention

However, in the above described conventional technique in which some channels are selected from all the channels, and the base station apparatus is notified of the channel quality information related to those some channels, it is necessary to notify channel identification information such as channel numbers for indicating the selected channels, and there is a problem of an increased amount of information in the channel identification information when the above described predetermined number increases.

An object of the present invention is to provide a technique for reducing an amount of notification information when some channels are selected from all the channels and the base station apparatus is notified of the channel quality information related to the channels.

Means for Solving the Problems

According to a viewpoint of the present invention, there is provided a communication system in which communication is performed via a plurality of channels in a downlink from a base station apparatus to a terminal apparatus, the terminal apparatus selects one or more channels from the plurality of channels in the downlink, and notifies the base station apparatus of notification information including at least channel identification information for specifying the selected channels, and the base station apparatus determines assignment of the channels in the downlink to the terminal apparatus, based on the notification infoimation notified from the terminal apparatus, wherein a representation format for the channel identification information is switched depending on the number of the selected channels. Preferably, the notification information further includes channel quality information related to reception quality in the selected channels.

Preferably, for the channel identification information, switching between a first representation format composed of identification numbers of the respective selected channels and a second representation format composed of a bit sequence representing whether or not each of the channels in the downlink is included in the selected channels, in a binary manner is performed depending on the number of the selected channels.

Moreover, preferably, for the channel identification information, switching between a first representation format composed of identification numbers of the respective selected channels and a second representation format composed of a bit sequence representing whether or not each of the channels in the downlink is included in the selected channels, in a binary manner is performed depending on the number of the channels in the downlink.

Preferably, the representation format for the channel identification information is switched by selecting one of the channel identification information with the first representation format and the channel identification information with the second representation format, which includes a smaller amount of information.

Preferably, as the representation format for the channel identification information, the first representation format is selected if a value obtained by multiplying the number of the selected channels by the number of bits required for representing the identification number of an individual channel is smaller in comparison with the number of the channels in the downlink; the second representation format is selected if the value obtained by multiplying the number of the selected channels by the number of bits required for representing the identification number of the individual channel is larger in comparison with the number of the channels in the downlink; or any one of the first representation format and the second representation format is selected if the value obtained by multiplying the number of the selected channels by the number of bits required for representing the identification number of the individual channel is equal to the number of the channels in the downlink. According to the above described configuration, an amount of the notification information can be reduced when some channels are selected from all the channels and the base station apparatus is notified of the channel quality informatinn related to the channels.

Moreover, there is provided a terminal apparatus which performs communication with a base station apparatus via a plurality of channels in a downlink, selects one or more channels from the plurality of channels in the downlink, and notifies the base station apparatus of notification information including at least channel identification information for specifying the selected channels, including a channel identification information generating section for switching a representation format depending on the number of the selected channels and generating the channel identification information.

Furthermore, there is provided a terminal apparatus which performs communication with a base station apparatus via a plurality of channels in a downlink, selects one or more channels from the plurality of channels in the downlink, and notifies the base station apparatus of notification information including at least channel identification information for specifying the selected channels, including a channel identification information generating section for switching a representation format depending on the number of the channels in the downlink and generating the channel identification information.

Moreover, there is provided a base station apparatus which performs communication with a terminal apparatus via a plurality of channels in a downlink, including a downlink control information generating section for generating information on the number of selected channels, which indicates the number of selected channels; a wireless transmitting section for transmitting the information on the number of selected channels, to the terminal apparatus; a wireless receiving section for receiving notification information including channel identification information for specifying channels of the number of selected channels, which have been selected from the plurality of channels in the downlink, from the terminal apparatus; a selected channel specifying section for specifying the selected channels from the channel identification information based on the number of selected channels; and a scheduler section for determining assignment of the channels in the downlink to the terminal apparatus, based on at least the selected channels.

According to another viewpoint of the present invention, there is provided a communication method in a terminal apparatus which performs communication with a base station apparatus via a plurality of channels in a downlink, selects one or more channels from the plurality of channels in the downlink, and notifies the base station apparatus of notification infoimation including at least channel identification information for specifying the selected channels, the communication method including a channel identification information generation step of switching a representation format depending on the number of the selected channels and generating the channel identification information.

Moreover, there is provided a communication method in a base station apparatus which performs communication with a terminal apparatus via a plurality of channels in a downlink, the communication method including a downlink control information generation step of generating information on the number of selected channels, which indicates the number of selected channels; a wireless transmission step of transmitting the information on the number of selected channels, to the terminal apparatus; a wireless reception step of receiving notification information including channel identification information for specifying channels of the number of selected channels, which have been selected from the plurality of channels in the downlink, from the terminal apparatus; a selected channel specification step of specifying the selected channels from the channel identification information based on the number of selected channels; and a scheduler step of determining assignment of the channels in the downlink to the terminal apparatus, based on at least the selected channels. The present invention may be a program for causing a computer to execute the above described steps, or may be a computer-readable recording medium for storing this program. The program may be obtained from a transmission medium.

Advantage of the Invention

According to the present invention, when the terminal apparatus selected some channels from all the channels and notifies the base station apparatus of the channel quality information related to the channels, the channel identification information for identifying the selected channels is notified after the representation format is switched depending on the number of the selected channels. Thereby, the amount of the notification information can be reduced.

DESCRIPTION OF SYMBOLS

300 . . . terminal apparatus, 308 . . . reception quality measuring section, 309 . . . notification information generating section, 314 . . . control information obtaining section, 341 . . . selected channel determining section, 342 . . . channel quality information generating section, 343 . . . channel identification information generating section, 344 . . . multiplexing section.

BEST MODE FOR CARRYING OUT THE INVENTION

Hereinafter, there will be described embodiments in which the present invention is applied to a cellular system which employs an Orthogonal Frequency Division Multiple Access (hereinafter described as "OFDMA".) system that is a multiple access scheme using Orthogonal Frequency Division Multiplex (hereinafter described as "OFDM".), and which performs adaptive modulation and scheduling (channel assignment) for each channel consisting of at least one subcarrier.

It should be noted that, in descriptions in the following respective embodiments, the descriptions are provided by exemplarily using an index calculated based on pilot symbols, for example, an SINR (Signal to Interference plus Noise power Ratio), as channel quality information.

[First Embodiment]

Figure 1:
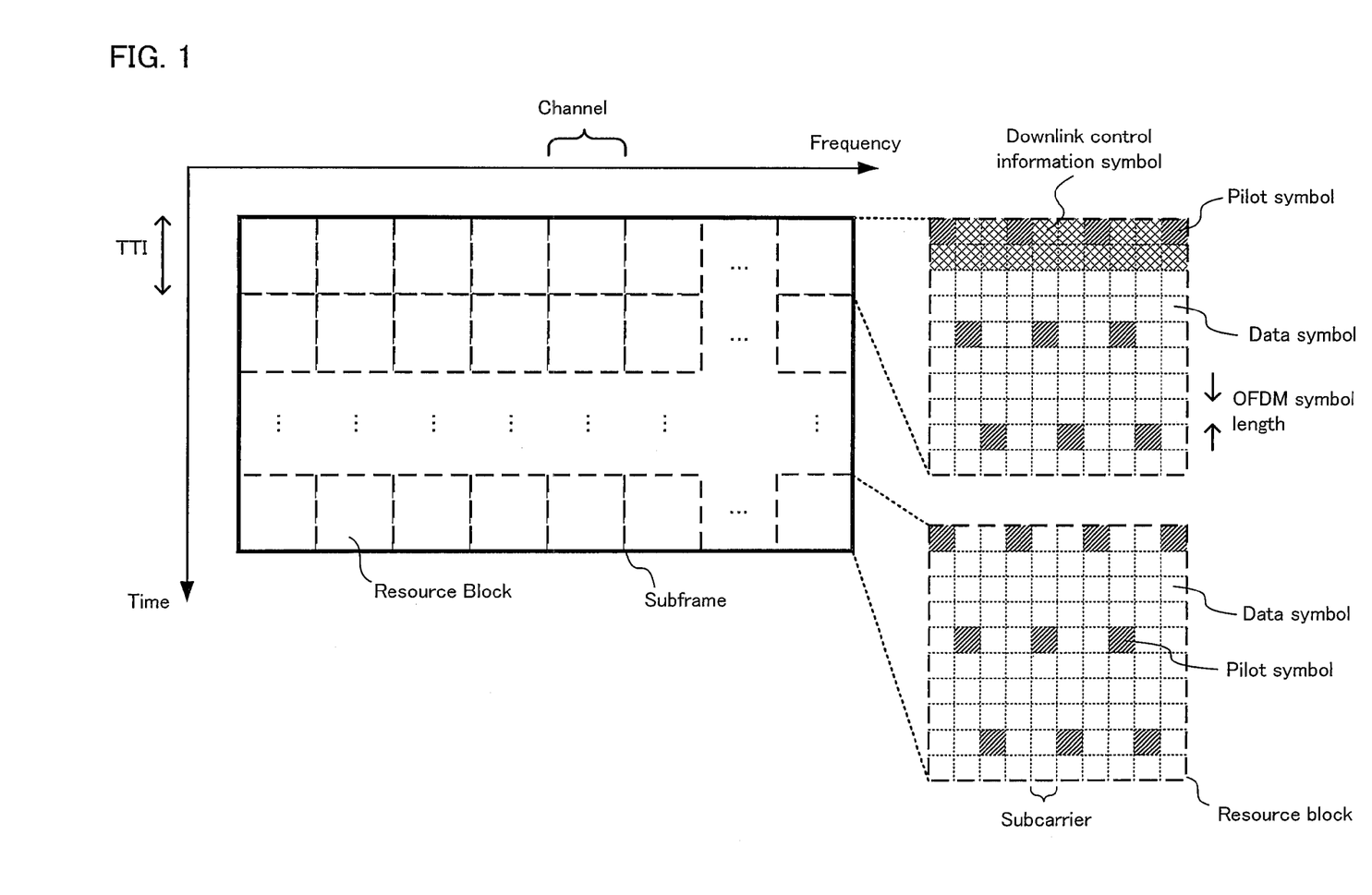
FIG. 1 is a diagram showing an example of a subframe configuration of a downlink according to the present embodiment.

Hereinafter, a communication technique according to a first embodiment of the present invention will he described with reference to the drawings. FIG. 1 is a diagram showing an example of a subframe configuration of a downlink according to the present embodiment. As shown in FIG. 1, in the present embodiment, "channel" means one or more subcarriers. Moreover, here, it is assumed that "subframe" means a unit of transmission, which is a range in which the channel assignment is performed in one scheduling process. Moreover, the subframe is divided into T (T is a natural number) at a predetermined time length TTI (Transmission Time Interval) in a time axis direction, and a unit of the scheduling (hereinafter referred to as "resource block".) is set within one TTI in one channel. Each terminal apparatus selects M channels in order of goodness of reception quality, from channels in the downlink (the total number of channels is N.) (M<N), and reports notification information consisting of the channel quality information representing reception quality measurement results of the respective selected channels and channel identification information indicating the selected channels, to a base station apparatus. A case will be described where the base station apparatus performs scheduling of downlink data to each terminal apparatus in units of resource blocks and performs the adaptive modulation. It should be noted that the scope of application of the present invention is not limited to the subframe configuration shown in FIG. 1, and in a system using a plurality of channels to perform communication, the present invention is applicable to a system in which the reception quality of each channel in each terminal apparatus may be different.

It should be noted that, as FIG. 1 is further described, a horizontal axis shows a frequency and a vertical axis shows time.

At the upper right of FIG. 1, a detailed configuration of one of the resource blocks to be transmitted first in the subframe is shown. One channel (at the upper right of FIG. 1) is divided into 10 subcarriers, and one TTI is divided into 10 OFDM symbols. In a first OFDM symbol in this resource block, pilot symbols are arranged in subcarriers at a minimum frequency and a maximum frequency, and two other pilot symbols are also arranged at regular intervals. In a second OFDM symbol, control symbols are arranged in first, fourth, seventh and tenth subcarriers in ascending order of the frequency of the OFDM symbol Tn third and subsequent OFDM symbols, data symbols are arranged. However, the pilot symbols are arranged in second, fifth and eighth subcarriers in ascending order of the frequency in a fifth OFDM symbol, and the pilot symbols are arranged in third, sixth and ninth subcarriers in a ninth OFDM symbol.

Moreover, at the lower right of FIG. 1, details of the resource block to be transmitted second and subsequently are shown. This resource block has the same configuration as that of the above described upper right resource block.

Figure 2:
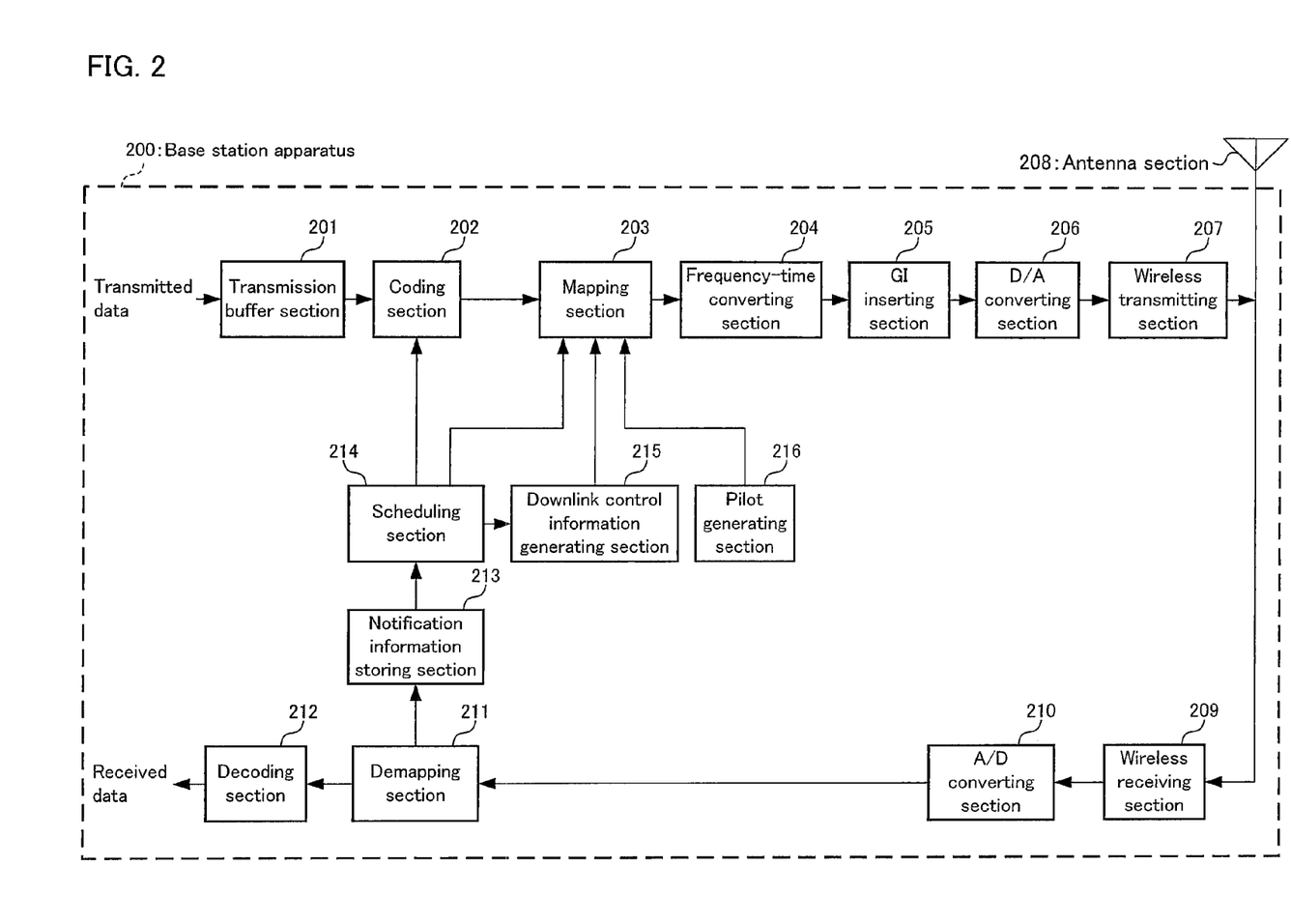
FIG. 2 is a functional block diagram showing a configuration example of a base station apparatus according to the present embodiment.
Figure 3:
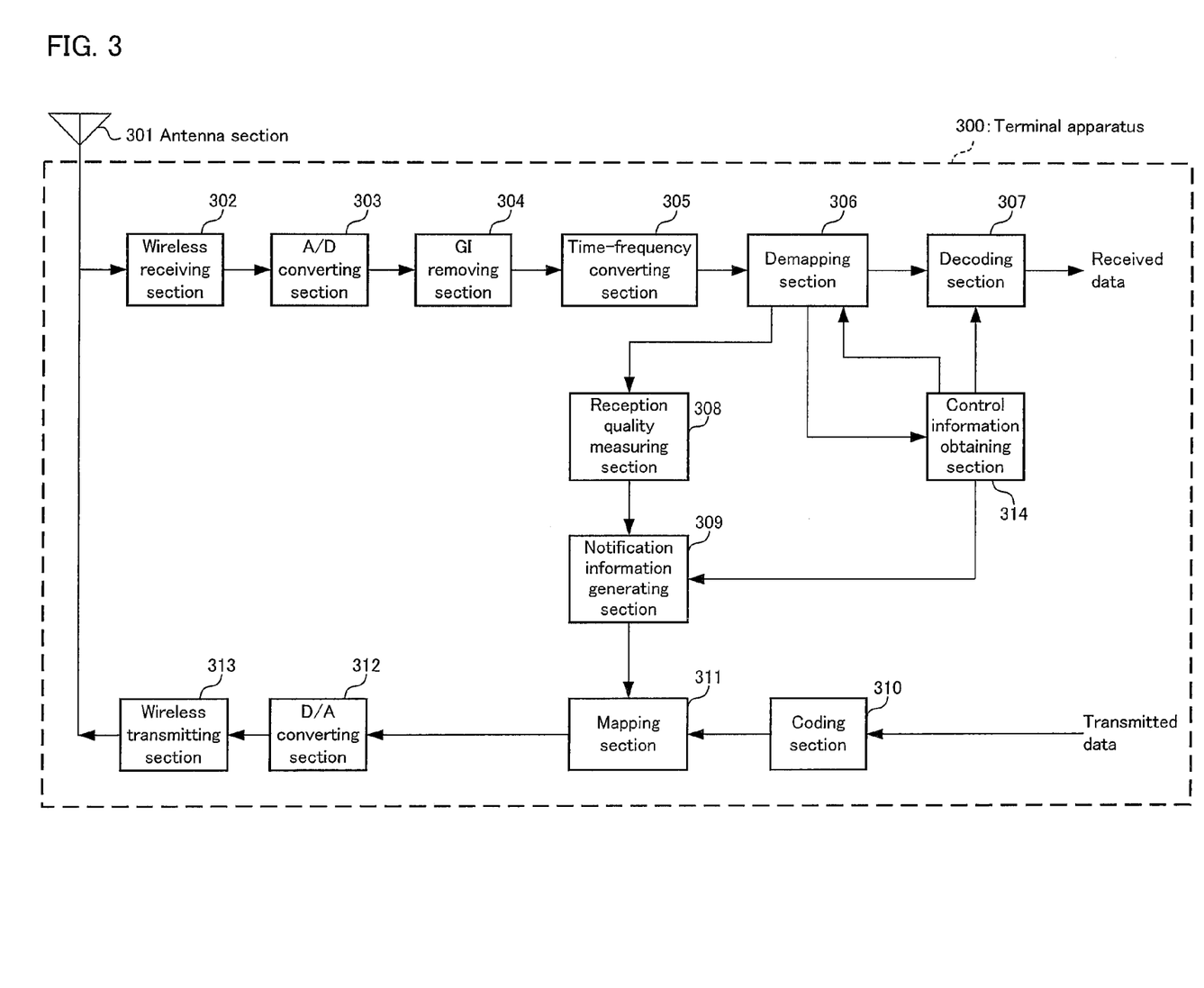
FIG. 3 is a functional block diagram showing a configuration example of a terminal apparatus 300 according to the present embodiment.

FIG. 2 is a functional block diagram showing a configuration example of a base station apparatus 200 according to the present embodiment. FIG. 3 is a functional block diagram showing a configuration example of a terminal apparatus 300 according to the present embodiment.

As shown in FIG. 2, the base station apparatus 200 has a transmission buffer section 201, a coding section 202, a mapping section 203, a frequency-time converting section 204, a GI (Guard Interval) inserting section 205, a D/A (Digital-to-Analog) converting section 206, a wireless transmitting section 207, an antenna section 208, a wireless receiving section 209, an A/D (Analog-to-Digital) converting section 210, a demapping section 211, a decoding section 212, a scheduling section 214, a downlink control information generating section 215, a pilot generating section 216, and a notification information storing section 213.

As shown in FIG. 3, the terminal apparatus 300 has an antenna section 301, a wireless receiving section 302, an A/D converting section 303, a GI removing section 304, a time-frequency converting section 305, a demapping section 306, a decoding section 307, a reception quality measuring section 308, a notification information generating section 309, a coding section 310, a mapping section 311, a D/A converting section 312, a wireless transmitting section 313, and a control informatinn obtaining section 314.

First, a procedure in which the base station apparatus 200 transmits a downlink signal and the terminal apparatus 300 receives this downlink signal will be described with reference to FIGS. 2 and 3.

Operations in the base station apparatus 200 will be described with reference to FIG. 2. The transmission buffer section 201 accumulates transmitted data which has been inputted, for each terminal apparatus which is a transmission destination, in a buffer, and in response to a request from the coding section 202, outputs the transmitted data which has been accumulated, to the coding section 202.

The scheduling section 214 reads information indicating the selected channels specified based on the channel quality information and the channel identification information, which have been notified from each terminal apparatus and stored in the notification information storing section 213. Then, based on the information, the terminal apparatus is assigned (scheduled) to each resource block of each channel, a modulation parameter to be used in each resource block is selected, and this scheduling result (scheduling information) and a modulation parameter selection result (modulation parameter information) are outputted.

It should be noted that the scheduling may be further performed based on information on an amount of the transmitted data from the transmission buffer section 201. The downlink control information generating section 215 generates and outputs downlink control information including the scheduling information and the modulation parameter information from the scheduling section 214.

Moreover, in a case of such a system in which the base station apparatus determines the number of channels on which the notification information is generated in the terminal apparatus (the number of selected channels) M, based on the number of the terminal apparatuses under the base station apparatus, an amount of the data transmitted in the downlink which is destined for each terminal apparatus, or the like, information for notifying the terminal apparatus of the number of selected channels M is also inserted in the downlink control information in the downlink control information generating section 215.

It should be noted that the number of selected channels M may be commonly determined in all the terminal apparatuses, or may be determined to be a different value for each terminal apparatus.

The coding section 202 reads a necessary amount of the transmitted data which is destined for each terminal apparatus, from the transmission buffer section 201, according to information on assignment of each terminal apparatus to the downlink (the scheduling information) notified from the scheduling section 214, further performs an error correction coding process for the transmitted data destined for each terminal apparatus, according to the modulation parameter information and the scheduling information which are notified from the scheduling section 214, and generates and outputs a data series. The pilot generating section 216 generates and outputs a pilot series which is inserted in the transmitted signal for reception quality measurement in the terminal apparatus.

The mapping section 203 maps each bit of the data series into a modulation symbol on the subcarrier based on the modulation parameter information and the scheduling information which are notified from the scheduling section 214, maps the downlink control information and the pilot series generated in the pilot generating section 216, into predetermined modulation symbols on predetermined subcarriers, and performs output thereof.

For example, in the example of FIG. 1, the data series is mapped into the data symbols in the figure based on the scheduling information, the pilot series is mapped into predetermined pilot symbols in the figure, and the downlink control information is mapped into predetermined downlink control information symbols in the figure, respectively.

The frequency-time converting section 204 applies a frequency-time conversion process, for example, Inverse Fast Fourier Transform (IFFT), to a modulation symbol series outputted from the mapping section 203 to convert the modulation symbol series into an OFDM signal in a time axis, and outputs the converted signal to the GI inserting section 205. The GI inserting section 205 adds a guard interval GI to the OFDM signal generated in the frequency-time converting section 204. The D/A converting section 206 converts the signal added with the guard interval GI into an analog signal. The wireless transmitting section 207 up-converts this analog signal, and transmits this analog signal via the antenna section 208 to the terminal apparatus 300.

Next, operations in the terminal apparatus 300 will be described with reference to FIG. 3. The signal transmitted from the base station apparatus 200 is received by the wireless receiving section 302 via the antenna section 301. The A/D converting section 303 converts the analog signal received and down-converted by the wireless receiving section 302, into a digital signal. The GI removing section 304 removes the guard interval GI from this digital signal, and outputs the signal from which the guard interval GI has been removed, to the time-frequency converting section 305.

The time-frequency converting section 305 applies time-frequency conversion, for example, Fast Fourier Transform (FFT), to the OFDM signal outputted from the GI removing section 304, and thereby converts the OFDM signal into the modulation symbol series.

The demapping section 306 first separates the pilot symbols from the modulation symbol series outputted from the time-frequency converting section 305, and outputs the pilot symbols to the reception quality measuring section 308. Next, the downlink control information is demapped and outputted to the control information obtaining section 314. Furthermore, the data series is demapped according to the scheduling information and the modulation parameter information from the control information obtaining section 314, and outputted to the decoding section 307. It should be noted that propagation path compensation may be performed for the modulation symbol series based on the pilot symbols.

The decoding section 307 performs an error correction decoding process for the data series outputted from the demapping section 306, according to the scheduling information and the modulation parameter information which have been outputted from the control information obtaining section 314, and outputs received data.

The control information obtaining section 314 extracts the scheduling information (information related to the resource block assigned to the transmitted data destined for the terminal apparatus 300) and the modulation parameter information (information related to the modulation parameter of the assigned resource block) from the downlink control information inputted from the demapping section 306, and outputs the scheduling information and the modulation parameter information to the demapping section 306 and the decoding section 307. It should be noted that if error correction coding has been previously applied to the downlink control information in the base station apparatus 200, the error correction decoding may be applied. Moreover, in the case of such a system in which the base station apparatus determines the number of selected channels M based on the number of the terminal apparatuses under the base station apparatus, the amount of the data transmitted in the downlink which is destined for each terminal apparatus, or the like, the information on the number of selected channels M, which has been inserted in the downlink control information, is extracted and outputted to the notification information generating section 309. Furthermore, in a case of such a system in which the terminal apparatus determines the number of selected channels M based on the amount of the data transmitted in the downlink, the reception quality or the like, the number of selected channels M is determined and outputted to the notification information generating section 309.

Next, a procedure in which the terminal apparatus 300 feeds back report information to the base station apparatus 200 will be described with reference to FIGS. 2 and 3.

The operations in the terminal apparatus 300 will be described by using FIG. 3. The reception quality measuring section 308 uses the pilot symbols outputted from the demapping section 306, to measure the reception quality in each channel, and outputs this reception quality measurement result to the notification information generating section 309. It should be noted that, in the present embodiment, while a case where the pilot symbols are used to measure the reception quality is described by way of example, of course, the present invention is also applicable to a case where the reception quality measurement using the data symbols, or the reception quality measurement using an error correction decoding determination result for the received data is performed.

The notification information generating section 309 selects M channels on which the channel quality information is notified, based on the reception quality measurement result in each channel which has been outputted from the reception quality measuring section 308, and a predetermined number of selected channels M which has been previously defined or the number of selected channels M which has been outputted from the control information obtaining section 314, and generates and outputs the channel quality information representing the reception quality measurement results of the selected M channels, and the channel identification information indicating the selected M channels. It should be noted that details of the notification information generating section 309 will be described later. The coding section 310 applies the error correction coding to the data transmitted to the base station apparatus, and outputs the data series.

The mapping section 311 maps the notification information generated by the notification information generating section 309, and the data series outputted from the coding section 310, into the modulation symbols, and outputs the modulation symbols. It should be noted that the notification information may be notified to the base station apparatus separately from the data transmitted to the base station apparatus. The D/A converting section 312 converts the signal outputted from the mapping section 311, into the analog signal. The wireless transmitting section 313 up-converts this converted analog signal, and transmits the converted analog signal via the antenna section 301 to the base station apparatus 200.

The operations in the base station apparatus 200 will be described with reference to FIG. 2. The signal transmitted from the terminal apparatus 300 is received by the wireless receiving section 209 via the antenna section 208. After the wireless receiving section 209 down-converts this received analog signal, the A/D converting section 210 converts the received analog signal into the digital signal, and outputs the digital signal to the demapping section 211.

The demapping section 211 demaps the digital signal (modulation symbols) transmitted from the A/D converting section 210, separates the notification information from the data series, outputs the notification information to the notification information storing section 213, and outputs the data series to the decoding section 212, respectively.

The decoding section 212 applies the error correction decoding to the data series retrieved in the demapping section 211, and retrieves the received data. The notification information storing section 213 specifies the channels selected by the terminal apparatus (a selected channel specifying section), based on the channel identification information in the notification information which has been notified from each terminal apparatus and separated by the demapping section 211, stores the specified channels and information other than the channel identification information in the notification information, for each terminal apparatus, and outputs the specified channels and the information other than the channel identification information in the notification information to the scheduling section 214. Here, the notification information storing section 213 specifies the channels based on the number of selected channels M and the number of the channels in the downlink N. It should be noted that, as an algorithm for specifying the channels, an algorithm to be described later (an algorithm similar to a method of selecting a representation format for the channel identification information in the notification information generating section 309 in the terminal apparatus 300) can be used.

Figure 4:
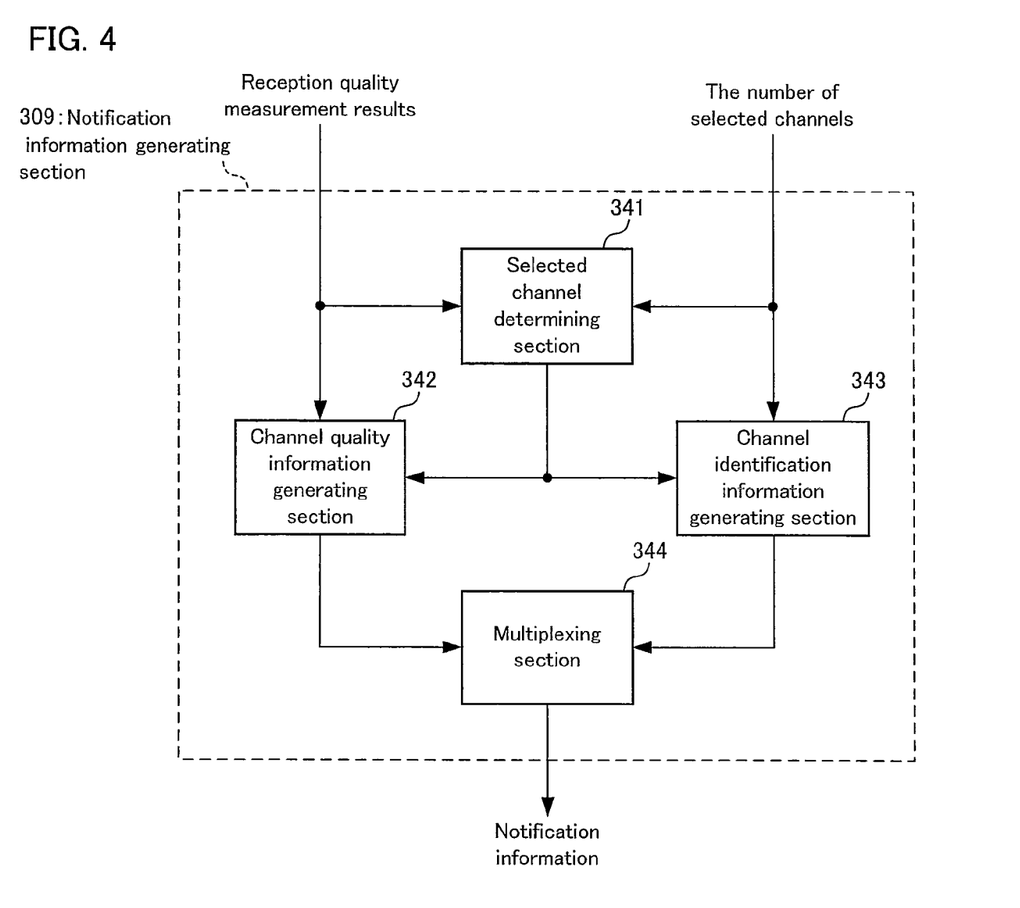
FIG. 4 is a functional block diagram showing a configuration example of a notification information generating section in the terminal apparatus.

FIG. 4 is a functional block diagram showing a configuration example of the notification information generating section 309 in the terminal apparatus 300. The reception quality measurement results of the respective channels which have been outputted from the reception quality measuring section 308 are inputted to a selected channel determining section 341 and a channel quality information generating section 342. Moreover, the number of selected channels M which has been previously defined or the number of selected channels M which has been outputted from the control information obtaining section 314 is inputted to the selected channel determining section 341 and a channel identification information generating section 343.

The selected channel determining section 341 selects M channels in order of the goodness of the reception quality measurement result, as the selected channels, based on the reception quality measurement results of the respective channels, and outputs a selection result.

The channel quality information generating section 342 generates and outputs the channel quality information representing the reception quality measurement results related to the selected M channels, based on the selection result outputted from the selected channel determining section 341.

The channel identification information generating section 343 selects one of a first representation format for representation with M identification numbers (channel numbers) indicating the respective selected channels, and a second representation format for representation with a bit sequence representing whether or not each of all the channels is included in the selected channels, in a binary manner, based on the number of selected channels M, and uses the selected representation format to generate and output the channel identification information based on the selection result outputted from the selected channel determining section 341. A multiplexing section 344 combines the channel quality information outputted from the channel quality information generating section 342 and the channel identification information outputted from the channel identification information generating section 343 to generate and output the notification information.

Figure 5:
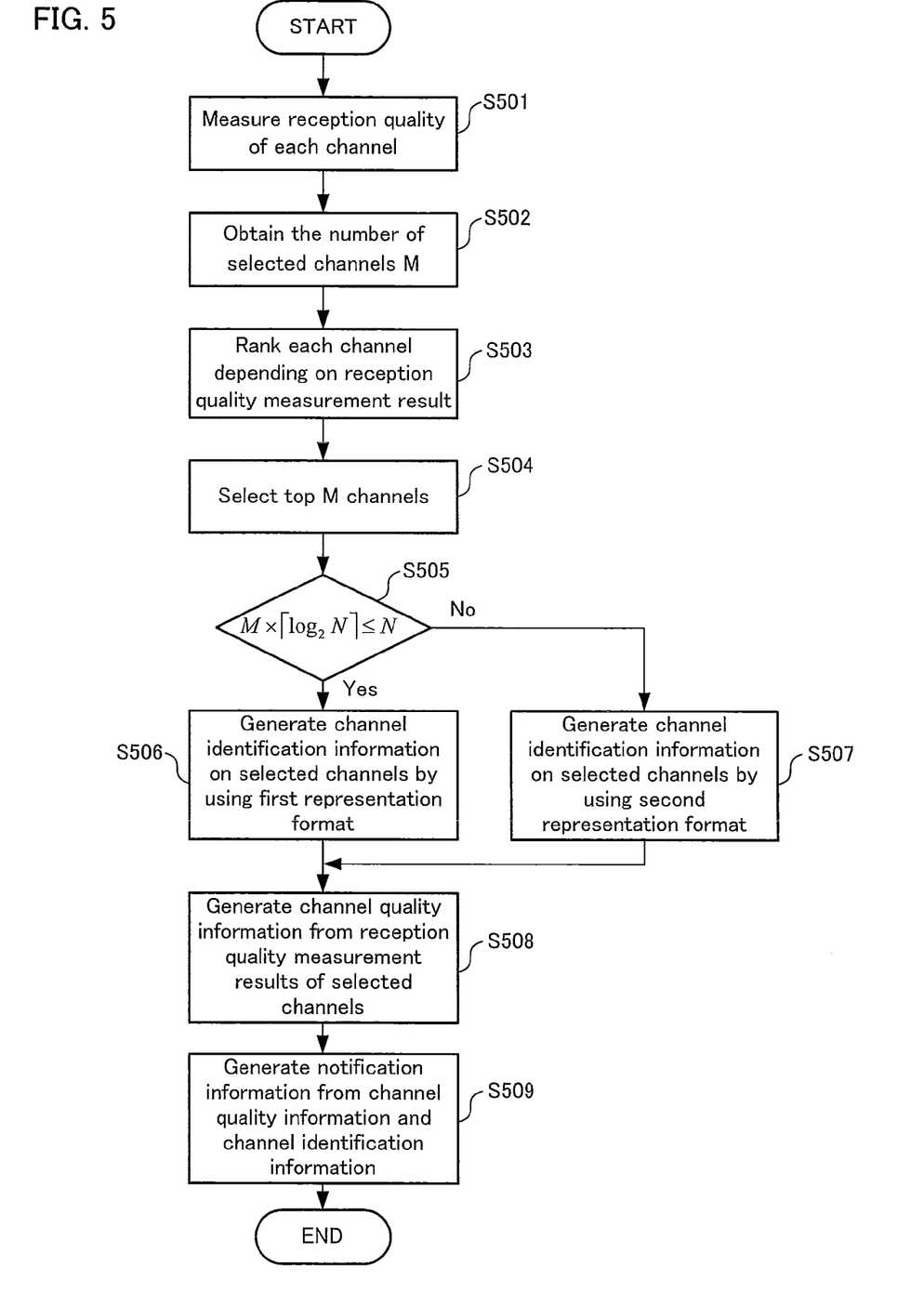
FIG. 5 is a flowchart diagram showing an example of an operation for generating reception quality information in the notification information generating section (and a reception quality measuring section).

FIG. 5 is a flowchart diagram showing an example of an operation for generating the notification information in the notification information generating section 309 (and the reception quality measuring section 308). FIG. 5 shows an example in a case where the total number of channels is N, and M channels are selected in order of the goodness of the reception quality from all the channels, as the selected channels. It should be noted that, here, N and M are natural numbers satisfying N>M.

Hereinafter, details of the operation for generating the notification information will be described with reference to FIG. 5. When a process is started, first, the pilot symbols outputted from the demapping section 306 are used to measure and output the reception quality in each channel (S501). The number of selected channels M which has been previously defined or the number of selected channels M which has been outputted from the control information obtaining section 314 is obtained (S502), each channel is ranked in order of the goodness of the reception quality measurement result (S503), and top M channels are selected as the selected channels (S504).

(The number of selected channels M)×(the smallest integer which is not below the number of bits required for representing the channel number=$\log_2 N$) is compared with the total number of channels N (S505). If both are equal or the total number of channels N is larger (Yes in S505), the channel identification information is generated by using the first representation format for the representation by collecting the channel numbers of the respective selected M channels (S506). If the total number of channels N is smaller (No in S505), the channel identification information is generated by using the second representation format for the representation with the bit sequence of N bits, in which each one bit corresponds to each of all the channels and is "1" if the corresponding channel is included in the selected channels or "0" if the corresponding channel is not included in the selected channels (S507). The channel quality information representing the reception quality measurement results related to the respective selected M channels is generated (S508). The channel identification information and the channel quality information are combined to generate the notification information (S509).

It should be noted that, in the comparison in a procedure in S505, while an example has been shown in a case where, if (the number of selected channels M)×(the number of bits required for representing the channel number) and the total number of channels are equal, Yes (branch to S506) is selected, No (branch to S507) may be selected.

Moreover, in a procedure in S507, the second representation format has been described so that "1" shows a case of being included in the selected channels and "0" shows a case of being not included in the selected channels, which, however, may be oppositely defined.

Figure 6:
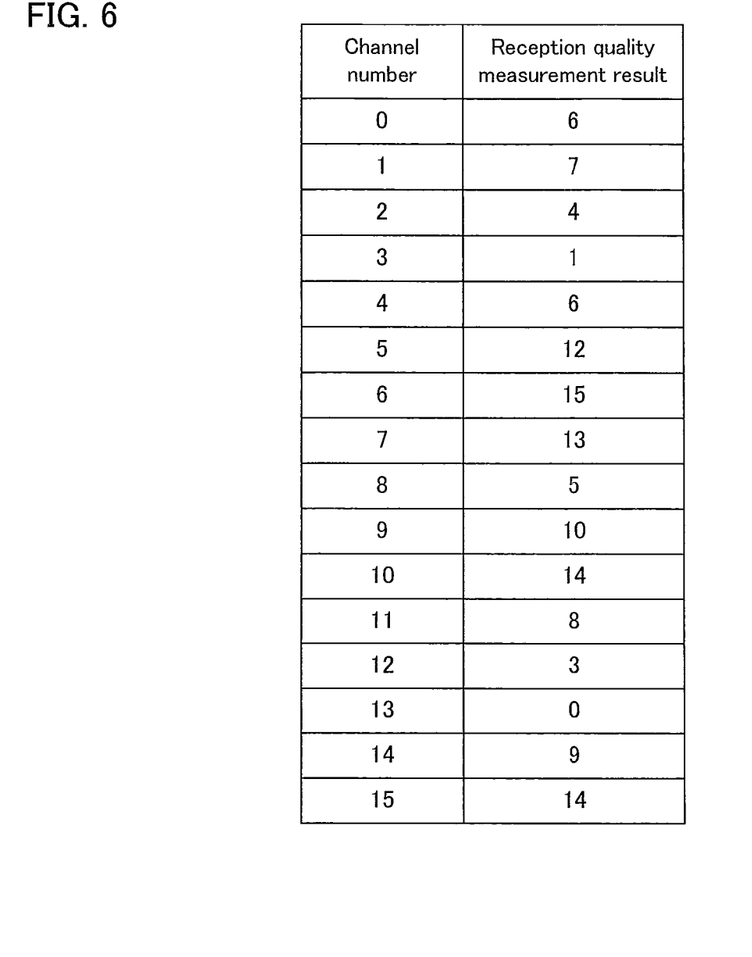
FIG. 6 is a diagram showing an example of reception quality measurement results of respective channels in a case where the total number of channels in the downlink N is 16 and the reception quality measurement results are represented in 16 levels (4 bits).

FIG. 6 is a diagram showing an example of the reception quality measurement results of the respective channels in a case where the total number of the channels in the downlink N is 16 and the reception quality measurement results are represented in 16 levels (4 bits). At this time, the identification number (channel number) of each channel is represented with 4 bits ($\log_2 16$).

Figure 7:
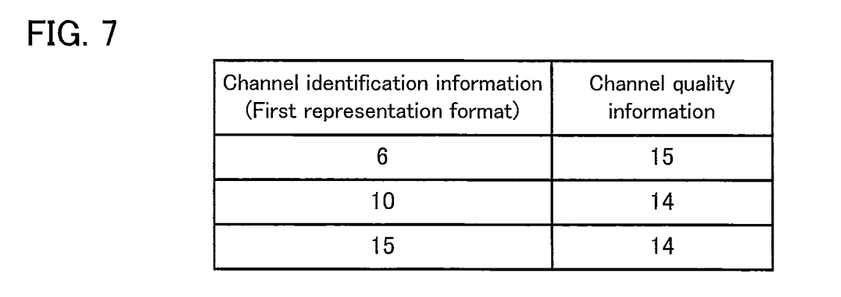
FIG. 7 is a diagram showing an example of notification information generated based on the reception quality measurement results of the respective channels shown in the example of FIG. 6, in the present embodiment.
Figure 8:
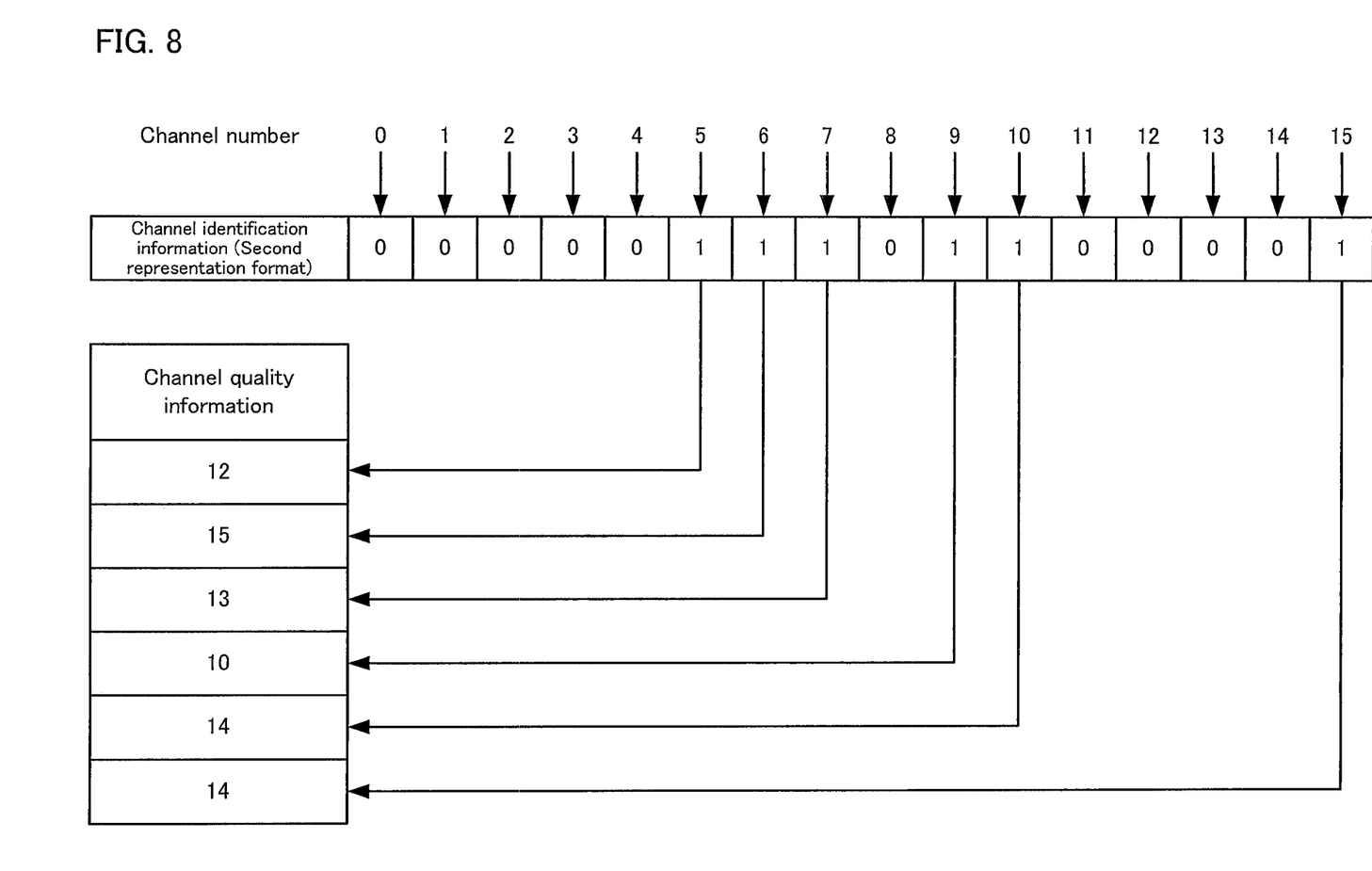
FIG. 8 is a diagram showing an example of the notification information generated based on the reception quality measurement results of the respective channels shown in the example of FIG. 6, in the present embodiment.

Moreover, FIGS. 7 and 8 are diagrams showing examples of the notification information generated based on the reception quality measurement results of the respective channels shown in the example of FIG. 6, in the present embodiment.

FIG. 7 is an example of the notification information in a case where three channels are selected as the selected channels (M=3), from the reception quality measurement results of the respective channels in FIG. 6. In the case of the example of FIG. 7, three channels in order of the goodness of the reception quality measurement result, that is, the channels with the channel numbers 6, 10 and 15 are selected as the selected channels, and (the number of selected channels M=3)×(the number of bits required for representing the channel number=4)=12 is smaller than the total number of channels N=16. Therefore, in the channel identification information, the first representation format is used to represent the channel numbers "6", "10" and "15" of the selected three channels with 4 bits, respectively, which are a total of 12 bits.

Moreover, an example of the channel quality information is shown in a case where the reception quality measurement results of the respective selected channels are directly represented with 4 bits, respectively. In the example of FIG. 7, the notification information is composed of 12 bits of the channel identification information and 12 bits of the channel quality information, which are a total of 24 bits. It should be noted that, in the example of FIG. 7, if the channel identification information is generated with the second representation format, the channel identification information includes 16 bits which are 4 bits larger, and the notification information includes a total of 28 bits.

FIG. 8 is an example of the notification information in a case where six channels are selected as the selected channels (M=6), from the reception quality measurement results of the respective channels in FIG. 6. In the case of the example of FIG. 8, six channels in order of the goodness of the reception quality measurement result, that is, the channels with the channel numbers 5, 6, 7, 9, 10 and 15 are selected as the selected channels, and (the number of selected channels M=6)×(the number of bits required for representing the channel number=4)=24 is larger than the total number of channels N=16. Therefore, the second representation format is used to represent the channel identification information with 16 bits, in which bits corresponding to the selected six channels are "1" in a bit sequence of 16 bits corresponding to the respective 16 channels. Moreover, the example of the channel quality information is shown in the case where the reception quality measurement results of the respective selected channels are directly represented with 4 bits, respectively. In the example of FIG. 8, the notification information is composed of 16 bits of the channel identification information and 24 bits of the channel quality information, which are a total of 40 bits. It should be noted that, in the example of FIG. 8, if the channel identification information is generated with the first representation format, the channel identification information includes 24 bits which are 8 bits larger, and the notification information includes a total of 48 bits.

As described above, according to the present embodiment, when some channels, that is, M channels are selected from all the channels in the downlink and the terminal apparatus 300 notifies the base station apparatus 200 of the channel quality information related to the M channels, for the channel identification information required for indicating the selected channels, one of the first representation format for the representation with the M identification numbers (channel numbers) indicating the respective selected channels, and the second representation format for the representation with the bit sequence representing whether or not each of all the channels is included in the selected channels, in a binary manner, is selected based on the number of selected channels M.

Thereby, depending on the number of selected channels M, the channel identification information can be generated with the representation format which makes a necessary amount of information smaller. Therefore, an amount of the notification information from the terminal apparatus to the base station apparatus can be reduced.

[Second Embodiment]

In the above described first embodiment, the case has been described where the number of the channels in the downlink N is assumed to be fixed, the base station apparatus notifies the terminal apparatus of the number of channels selected by the terminal apparatus M, and the representation format for the identification information on the selected channels is changed depending on M.

In the present embodiment, another example related to a timing of changing the representation format for the channel identification information will be shown in a case where the number of the channels in the downlink N is variable.

Figure 9:
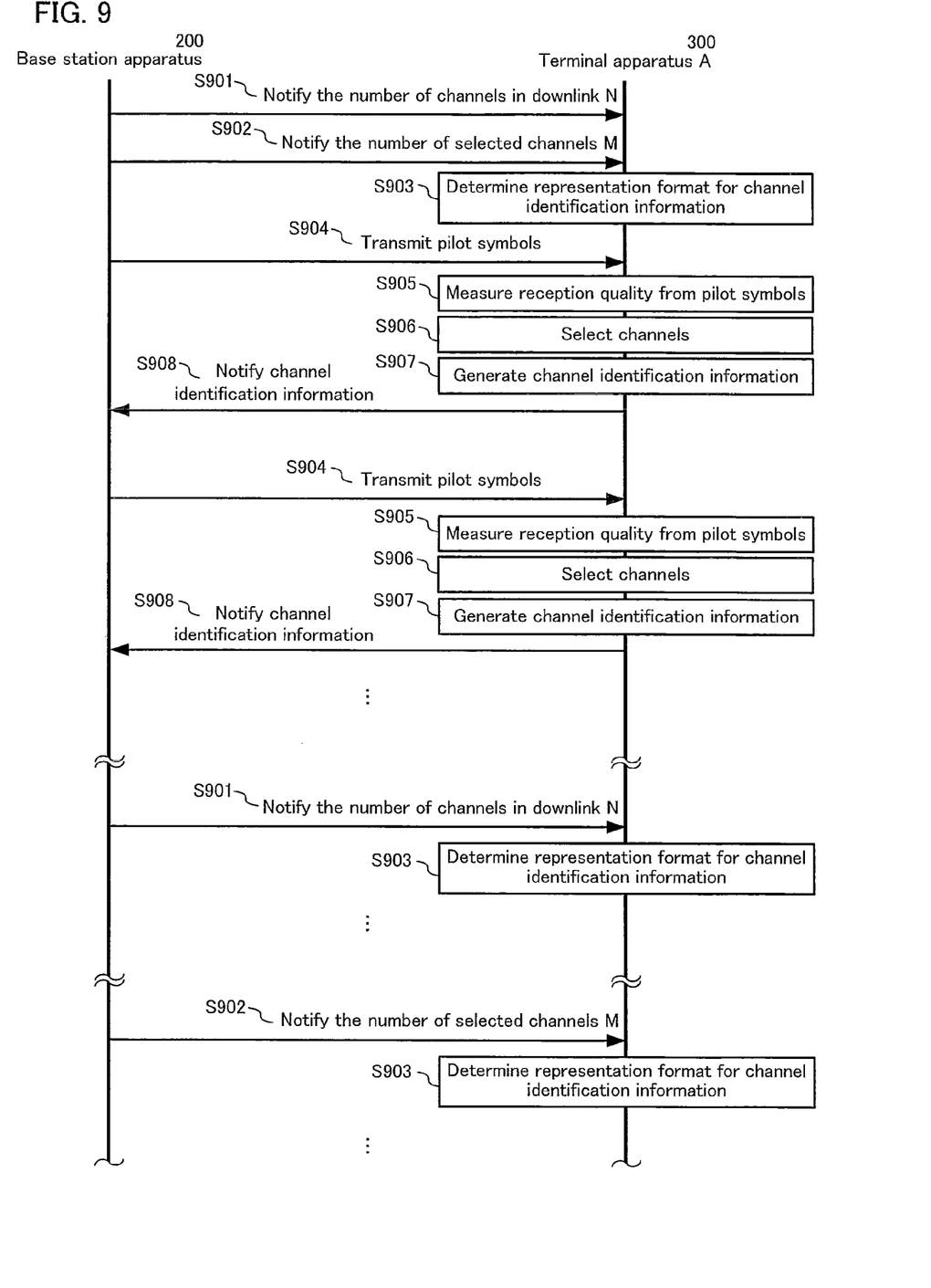
FIG. 9 is diagram showing an example of a process the terminal apparatus when a representation format for channel identification information is determined or changed in the terminal apparatus.

FIG. 9 is a diagram showing an example of a process in the terminal apparatus when the representation format for the channel identification information is determined or changed in the terminal apparatus. First, the base station apparatus 200 notifies a terminal apparatus A300 of the number of the channels in the downlink N, which can be used by the terminal apparatus A300 (step S901). Furthermore, the base station apparatus 200 notifies the terminal apparatus A300 of the number of channels selected by the terminal apparatus A300, M (step S902). The terminal apparatus A300 determines the representation format for the channel identification information based on N and M (step S903). It should be noted that, regarding a determination method, a method similar to the method described in the first embodiment can be used.

When the base station apparatus 200 transmits the pilot symbols (step S904), the terminal apparatus A300 measures the reception quality from the pilot symbols (step S905), selects the channels based on the measured reception quality (step S906), and generates the channel identification information based on a representation method determined in step 903 (step S907). Subsequently, the terminal apparatus A300 notifies the base station apparatus 200 of the generated channel identification information (step S908).

If the base station apparatus 200 does not notify the terminal apparatus A300 of N or does not notify the terminal apparatus A300 of M (or if N and M are not changed), a process from steps S904 to S908 is repeatedly performed. On the other hand, in the middle of the process, if the number of the channels in the downlink N is notified again, or if the number of selected channels M is notified again, the terminal apparatus A300 determines the representation format for the channel identification information again, and then repeatedly performs the process from steps S904 to S908.

As described above, according to the present embodiment, when the base station apparatus notifies the terminal apparatus of the number of the channels in the downlink N, which can be used by the terminal apparatus, and the number of selected channels M, the terminal apparatus selects (determines), for the channel identification information required for indicating the selected channels, one of the first representation format for the representation with the M identification numbers (channel numbers) indicating the respective selected channels, and a second representation format for representation with a bit sequence representing whether or not each of N channels is included in the selected channels, in a binary manner, based on N and M.

Thereby, depending on the number of the channels in the downlink N or the number of selected channels M, the channel identification information can be generated with the representation format which makes the necessary amount of information smaller. Therefore, the amount of the notification information from the terminal apparatus to the base station apparatus can be reduced.

As described above, in the above described respective embodiments, the present invention has been described with the example using the SINR calculated based on the pilot symbols as the reception quality, in the cellular system in which:

1) transmission system: multicarrier transmission system (particularly, OFDM transmission system);

2) channel configuration: at least on subcarrier is included.

3) Unit of reception quality information and adaptive modulation: for each channel; and 4) adaptive scheduling (channel assignment): for each channel or for each resource block provided by further dividing the channel in a time direction.

However, a modulation scheme, the channel configuration, the unit of the reception quality information and the adaptive modulation, the adaptive scheduling (channel assignment), and the reception quality, to which the present invention is applicable, are not limited to those described above.

For example, in an MC-CDMA (Multi Carrier-Code Division Multiple Access) system using a spreading technique as the transmission system, even in another system for performing the communication by using a plurality of channels, such as a plurality of channels indicated by a transmission antenna or a specific mode in SDMA (Space Division Multiple Access) such as MIMO (Multiple Input Multiple Output), a plurality of code channels in CDMA, or channels as a combination thereof, for the unit of the adaptive modulation and the adaptive scheduling, the present invention is applicable in a system in which the reception quality may be different for each channel.

Moreover, if the reception quality information is:

an index indicating the reception quality related to received signal power or carrier power, such as an RSSI (Received Signal Strength Indicator), the SNR, an SIR (Signal to Interference power Ratio), a CNR (Carrier to Noise power Ratio), a CIR (Carrier to Interference power Ratio), or a CINR (Carrier to Interference plus Noise power Ratio); or an index related to a transmission speed, such as a modulation parameter selected depending on a propagation path state, such as a modulation parameter such as an MCS (Modulation and Coding Scheme) which is a combination of the modulation scheme and a channel coding rate, or a transmission rate, the reception Quality information is not otherwise limited Moreover, the unit of the channel quality information and the adaptive modulation may be for each subcarrier group consisting of one or more subcarriers in the channel.

Moreover, in the above described respective embodiments, while the case has been described where the terminal apparatus notifies the base station apparatus of the channel identification information indicating the selected channels and the channel quality information indicating the reception quality in the respective selected channels, the scope of application of the present invention is not limited thereto. For example, the present invention is also applicable to other systems in which the M channels are selected from the N channels and a communication partner is notified of the channel identification information indicating the M channels, such as such a system in which the terminal apparatus selects the M channels from the N downlink channels and notifies the channel identification information indicating the M channels and average channel quality information indicating average reception quality in the M channels; or such a system in which the M channels are selected from the N downlink channels, and the channel identification information indicating the M channels and DCT channel quality information indicating a result of applying DCT (Discrete Cosine Transform) transform to the reception quality in the M channels are notified; or a system in which the terminal apparatus selects M poor channels from the N downlink channels and notifies only the channel identification information indicating the M channels.

Moreover, in the above described respective embodiments, in a communication system which is composed of the base station apparatus and the terminal apparatus and employs FDD (Frequency Division Duplex), an adaptive modulation system of the OFDM is assumed in downlink communication and a system which does not perform the OFDM and the adaptive modulation is assumed in uplink communication, which, however, is not limited thereto.

Furthermore, the present invention is applicable to a set of communication apparatuses in a relationship in which any of a plurality of communication apparatuses can implement a scheduling function and the adaptive modulation and other communication apparatuses can implement a notification information transmission function.

It should be noted that two communication apparatuses have been described in which the communication apparatus for notifying the notification information (the communication apparatus having the notification information transmission function) is the terminal apparatus, and the communication apparatus for assigning data to be transmitted to each terminal apparatus, to each channel based on the notified notification information, and performing the adaptive modulation (the communication apparatus for performing the scheduling function) is the base station apparatus. However, one communication apparatus may also have both functions.

In the present description, a term "terminal apparatus" has been used to denote an apparatus for performing wireless communication with a communication apparatus of a communication partner, including a wireless device, a mobile terminal apparatus, a mobile phone and the like.

Industrial Applicability

The present invention can be used for the communication apparatus.

The invention claimed is:

1. A communication system in which communication is performed via a plurality of channels in a downlink from a base station apparatus to a terminal apparatus, said terminal apparatus selects one or more channels from said plurality of channels in the downlink, and notifies said base station apparatus of notification information including at least channel identification information for specifying selected channels, and said base station apparatus determines assignment of said channels in the downlink to the terminal apparatus, based on said notification information notified from said terminal apparatus, wherein
a representation format for said channel identification information is switched depending on the number of said selected channels compared to the number of said channels present in the downlink.

2. The communication system according to claim 1, wherein said notification information further includes channel quality information related to reception quality in said selected channels.

3. The communication system according to claim 2, wherein
for said channel identification information, switching between
a first representation format composed of identification numbers of said respective selected channels; and
a second representation format composed of a bit sequence representing whether or not each of said channels in the downlink is included in said selected channels, in a binary manner
is performed depending on the number of said selected channels, compared to the number of said channels present in the downlink, where number of said channels present in the downlink is constant.

4. The communication system according to claim 2, wherein
for said channel identification information, switching between
a first representation format composed of identification numbers of said respective selected channels; and
a second representation format composed of a bit sequence representing whether or not each of said channels in the downlink is included in said selected channels, in a binary manner
is performed depending on the number of said selected channels, compared to the number of said channels present in the downlink, where number of said channels present in the downlink is variable.

5. The communication system according to claim 1, wherein
for said channel identification information, switching between
a first representation format composed of identification numbers of said respective selected channels; and
a second representation format composed of a bit sequence representing whether or not each of said channels in the downlink is included in said selected channels, in a binary manner
is performed depending on the number of said selected channels compared to the number of said channels present in the downlink, where number of said channels present in the downlink is constant.

6. The communication system according to claim 5, wherein
as the representation format for said channel identification information,
said first representation format is selected if a value obtained by multiplying the number of said selected channels by the number of bits required for representing the identification number of an individual channel is smaller in comparison with the number of said channels in the downlink;
said second representation format is selected if the value obtained by multiplying the number of said selected channels by the number of bits required for representing the identification number of the individual channel is larger in comparison with the number of said channels in the downlink; or
any one of said first representation format and said second representation format is selected if the value obtained by multiplying the number of said selected channels by the number of bits required for representing the identification number of the individual channel is equal to the number of said channels in the downlink.

7. The communication system according to claim 1, wherein
for said channel identification information, switching between
a first representation format composed of identification numbers of said respective selected channels; and a second representation format composed of a bit sequence representing whether or not each of said channels in the downlink is included in said selected channels, in a binary manner is performed depending on the number of said selected channels compared to the number of said channels present in the downlink, where number of said channels present in the downlink is variable.

8. The communication system according to claim 7, wherein as the representation format for said channel identification information, said first representation format is selected if a value obtained by multiplying the number of said selected channels by the number of bits required for representing the identification number of an individual channel is smaller in comparison with the number of said channels in the downlink;

said second representation format is selected if the value obtained by multiplying the number of said selected channels by the number of bits required for representing the identification number of the individual channel is larger in comparison with the number of said channels in the downlink; or any one of said first representation format and said second representation format is selected if the value obtained by multiplying the number of said selected channels by the number of bits required for representing the identification number of the individual channel is equal to the number of said channels in the downlink.

9. A terminal apparatus which performs communication with a base station apparatus via a plurality of channels in a downlink, selects one or more channels from said plurality of channels in the downlink, and provides said base station apparatus with notification information including at least channel identification information for specifying selected channels, comprising:

an information processing device comprising a channel identification information generating section, said information processing device being configured to switch a representation format depending on the number of said selected channels compared to the number of said channels present in the downlink, and generating said channel identification information.

10. The terminal apparatus according to claim 9, which performs the communication with the base station apparatus via the plurality of channels in the downlink, selects one or more channels from said plurality of channels in the downlink, and provides said base station apparatus with the notification information including at least channel identification information for specifying selected channels, wherein said terminal apparatus further comprises:

an information processing device comprises a channel quality information generating section for generating channel quality information related to reception quality in said selected channels.

11. The terminal apparatus according to claim 10, wherein said channel identification information generating section switches between a first representation format composed of identification numbers of said respective selected channels; and a second representation format composed of a bit sequence representing whether or not each of said channels in the downlink is included in said selected channels, in a binary manner, depending on the number of said selected channels compared to the number of said channels present in the downlink, where number of said channels present in the downlink is constant, and generates the channel identification information.

12. The terminal apparatus according to claim 10, wherein said channel identification information generating section switches between a first representation format composed of identification numbers of said respective selected channels; and a second representation format composed of a bit sequence representing whether or not each of said channels in the downlink is included in said selected channels, in a binary manner, depending on the number of said selected channels compared to the number of said channels present in the downlink, where number of said channels present in the downlink is variable, and generates the channel identification information.

13. The terminal apparatus according to claim 9, wherein said channel identification information generating section switches between a first representation format composed of identification numbers of said respective selected channels; and a second representation format composed of a bit sequence representing whether or not each of said channels in the downlink is included in said selected channels, in a binary manner, depending on the number of said selected channels compared to the number of said channels present in the downlink, where number of said channels present in the downlink is constant, and generates the channel identification information.

14. The terminal apparatus according to claim 13, wherein said channel identification information generating section generates the channel identification information by selecting:

said first representation format if a value obtained by multiplying the number of said selected channels by the number of bits required for representing the identification number of an individual channel is smaller in comparison with the number of said channels in the downlink;

said second representation format if the value obtained by multiplying the number of said selected channels by the number of bits required for representing the identification number of the individual channel is larger in comparison with the number of said channels in the downlink; or any one of said first representation format and said second representation format if the value obtained by multiplying the number of said selected channels by the number of bits required for representing the identification number of the individual channel is equal to the number of said channels in the downlink.

15. The terminal apparatus according to claim 9, wherein said channel identification information generating section switches between a first representation format composed of identification numbers of said respective selected channels; and a second representation format composed of a bit sequence representing whether or not each of said channels in the downlink is included in said selected channels, in a binary manner, depending on the number of said selected channels compared to the number of said channels present in the downlink, where number of said channels present in the downlink is variable, and generates the channel identification information.

16. The terminal apparatus according to claim 15, wherein said channel identification information generating section generates the channel identification information by selecting:
said first representation format if a value obtained by multiplying the number of said selected channels by the number of bits required for representing the identification number of an individual channel is smaller in comparison with the number of said channels in the downlink;
said second representation format if the value obtained by multiplying the number of said selected channels by the number of bits required for representing the identification number of the individual channel is larger in comparison with the number of said channels in the downlink; or
any one of said first representation format and said second representation format if the value obtained by multiplying the number of said selected channels by the number of bits required for representing the identification number of the individual channel is equal to the number of said channels in the downlink.

17. A base station apparatus which performs communication with a terminal apparatus via a plurality of channels in a downlink, comprising:
an information processing device comprising a wireless receiving section for receiving notification information including channel identification information for specifying a number of selected channels, which have been selected from said plurality of channels in the downlink, sent from a terminal apparatus;
an information processing device comprising a selected channel specifying section for specifying said selected channels from said channel identification information based on said number of selected channels;
an information processing device comprising a scheduler section for generating scheduling information specifying assignment of said channels in the downlink to the terminal apparatus, and modulation parameter information, based on at least said selected channels;
an information processing device comprising a downlink control information generating section for generating downlink control information, said downlink control information comprising the scheduling information, and the modulation parameter information; and
an information processing device comprising a wireless transmitting section for transmitting said information on the selected channels, to the terminal apparatus.

18. A communication method in a terminal apparatus which performs communication with a base station apparatus via a plurality of channels in a downlink, selects one or more channels from said plurality of channels in the downlink, and notifies said base station apparatus of notification information including at least channel identification information for specifying selected channels, the communication method comprising:
a channel identification information generation step of switching a representation format depending on the number of said selected channels compared to the number of said channels present in the downlink, where number of said channels present in the downlink is constant, and generating said channel identification information.

19. A non-transitory computer-readable memory medium storing a computer program for causing a computer to perform a communication process as in claim 18.

20. A communication method in a base station apparatus which performs communication with a terminal apparatus via a plurality of channels in a downlink, the communication method comprising:
a wireless reception step of receiving notification information from a terminal apparatus including channel identification information for specifying a number of selected channels, which have been selected from said plurality of channels in the downlink;
a selected channel specification step of specifying said selected channels from said channel identification information based on said number of selected channels;
a scheduler step of generating scheduling information specifying assignment of said channels in the downlink to the terminal apparatus, and modulation parameter information, based on at least said selected channels;
a downlink control information generation step of generating downlink control information comprising the scheduling information and the modulation parameter information;
a wireless transmission step of transmitting said information on the number of selected channels, to the terminal apparatus.

21. A non-transitory computer-readable memory medium storing a computer program for causing a computer to perform a communication process as in claim 20.

22. A communication method in a terminal apparatus which performs communication with a base station apparatus via a plurality of channels in a downlink, selects one or more channels from said plurality of channels in the downlink, and notifies said base station apparatus of notification information including at least channel identification information for specifying selected channels, the communication method comprising:
a channel identification information generation step of switching a representation format depending on the number of said selected channels compared to the number of said channels present in the downlink, where number of said channels present in the downlink is variable, and generating said channel identification information.

23. A non-transitory computer-readable memory medium storing a computer program for causing a computer to perform a communication process as in claim 22.

* * * * *